US012700972B2

(12) United States Patent
Ahmadian Tehrani et al.

(10) Patent No.: US 12,700,972 B2
(45) Date of Patent: Aug. 4, 2026

(54) DYNAMIC SEARCH SPACE SET LINKING

(71) Applicant: Nokia Technologies Oy, Espoo (FI)

(72) Inventors: Amir Mehdi Ahmadian Tehrani, Munich (DE); Keeth Saliya Jayasinghe Laddu, Espoo (FI); Matha Deghel, Massy (FR); Youngsoo Yuk, Seoul (KR)

(73) Assignee: Nokia Technologies Oy, Espoo (FI)

( * ) Notice: Subject to any disclaimer, the term of this patent is extended or adjusted under 35 U.S.C. 154(b) by 323 days.

(21) Appl. No.: 18/550,379

(22) PCT Filed: Mar. 22, 2022

(86) PCT No.: PCT/EP2022/057403
§ 371 (c)(1),
(2) Date: Sep. 13, 2023

(87) PCT Pub. No.: WO2022/214304
PCT Pub. Date: Oct. 13, 2022

(65) Prior Publication Data
US 2024/0305429 A1      Sep. 12, 2024

(30) Foreign Application Priority Data

Apr. 6, 2021      (EP) .................................... 21166904

(51) Int. Cl.
*H04L 5/00*                (2006.01)

(52) U.S. Cl.
CPC .......... *H04L 5/0053* (2013.01); *H04L 5/0035* (2013.01); *H04L 5/0091* (2013.01)

(58) Field of Classification Search
CPC .... H04L 5/0053; H04L 5/0035; H04L 5/0091
See application file for complete search history.

(56) References Cited

U.S. PATENT DOCUMENTS

| | | | |
|---|---|---|---|
| 2020/0389874 A1* | 12/2020 | Lin | H04L 5/0053 |
| 2021/0112529 A1* | 4/2021 | Jassal | H04W 76/27 |
| 2022/0271909 A1* | 8/2022 | Abotabl | H04L 5/14 |

FOREIGN PATENT DOCUMENTS

| | | |
|---|---|---|
| EP | 3809650 A1 | 4/2021 |
| WO | 2019/244222 A1 | 12/2019 |

(Continued)

OTHER PUBLICATIONS

3GPP TSG RAN WG1 Meeting#90bis, R1-1718323 Title:Discussion on search space and CORESET design (Year: 2017).*

(Continued)

*Primary Examiner* — Faruk Hamza
*Assistant Examiner* — Abusayeed M Haque
(74) *Attorney, Agent, or Firm* — Lippes Mathias LLP

(57)      ABSTRACT

A method comprising obtaining information regarding a linkage of a first search space set and a second search space set, wherein the first search space set and the second search space set are associated with a multi transmission reception point physical downlink control channel repetition, determining, based on the obtained information, that the first search space set and the second search space set are linked search space sets, determining for the linked search space sets a presence information of a transmission configuration indication, and based on the presence information, determining a field size of the transmission configuration indication in a downlink control information for the multiple transmission reception point physical downlink control channel repetition.

19 Claims, 9 Drawing Sheets

710 Determine a change on the linked CORESETs in which SSSets are configured for M-TRP PDCCH repetition.

722 Determine tcipresentinDCI field of the newCORESET comprising assigned linking SSSet ID With respect to the reference CORESET with lowest ID 724 Assume the tcipresentinDCI of the new CORESET comprising the linking SSSet ID based on the described rule.

730 Decode DCI according to one of the following:
• Decode DCI considering first linked SSSet set of PDCCH candidates at the reference CORESET.
• Decode DCI considering newly second linked SSSet of PDCCH candidates at the new CORESET.
• Decode DCI considering both CORESETs PDCCH candidates 740 Determine scheduling offset from the PDCCH belonging to the "second" set of PDCCH candidates of the "second" SSSet.

750 Compare, for a DL grant, determined scheduling offset to timeDurationForQCL to derive a beam associated with the PDSCH allocation.

(56) References Cited

FOREIGN PATENT DOCUMENTS

| | | | | |
|---|---|---|---|---|
| WO | 2020/142734 A1 | 7/2020 | | |
| WO | WO-2020143524 A1 * | 7/2020 | ............ | H04W 72/23 |
| WO | 2021/022736 A1 | 2/2021 | | |

OTHER PUBLICATIONS

3GPP TSG-RAN WG1 Meeting#98bis, R1-1910360 Title:Draft CR on type-1 HARQ-ACK codebook (Year: 2019).*

Office action received for corresponding European Patent Application No. 21166904.9, dated Dec. 9, 2024, 7 pages.

"New WID: Further enhancements on MIMO for NR", 3GPP TSG RAN Meeting #86, RP-193133, Agenda: 9.1.1, Samsung, Dec. 9-12, 2019, 5 pages.

"3rd Generation Partnership Project; Technical Specification Group Radio Access Network; NR; Physical layer procedures for control (Release 16)", 3GPP TS 38.213, V16.4.0, Dec. 2020, pp. 1-181.

Takeda et al., "Understanding the Heart of the 5G Air Interface: An Overview of Physical Downlink Control Channel for 5G New Radio", IEEE Communications Standards Magazine, vol. 4, No. 3, Sep. 2020, pp. 22-29.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"Discussion Summary for mTRP PDCCH Reliability Enhancements", 3GPP TSG-RAN WG1 Meeting #104-e, R1-2101838, Agenda: 8.1.2.1, Qualcomm, Jan. 25-Feb. 5, 2021, 49 pages.

"Summary #2 of email discussions [104-e-NR-feMIMO-02] for mTRP PDCCH enhancements", 3GPP TSG-RAN WG1 Meeting #104-e, R1-2101839, Agenda: 8.1.2.1, Qualcomm, Jan. 25-Feb. 5, 2021, 25 pages.

"Summary #3 of email discussions [104-e-NR-feMIMO-02] for mTRP PDCCH enhancements", 3GPP TSG-RAN WG1 Meeting #104-e, R1-2101954, Agenda: 8.1.2.1, Qualcomm, Jan. 25-Feb. 5, 2021, 13 pages.

Extended European Search Report received for corresponding European Patent Application No. 21166904.9, dated Oct. 20, 2021, 11 pages.

"Enhancements for Multi-TRP URLLC schemes", 3GPP TSG RAN WG1 #104-bis-e Meeting, R1-2103366, Agenda: 8.1.2.1, Nokia, Apr. 12-20, 2021, 32 pages.

International Search Report and Written Opinion received for corresponding Patent Cooperation Treaty Application No. PCT/EP2022/057403, dated Apr. 26, 2022, 14 pages.

* cited by examiner

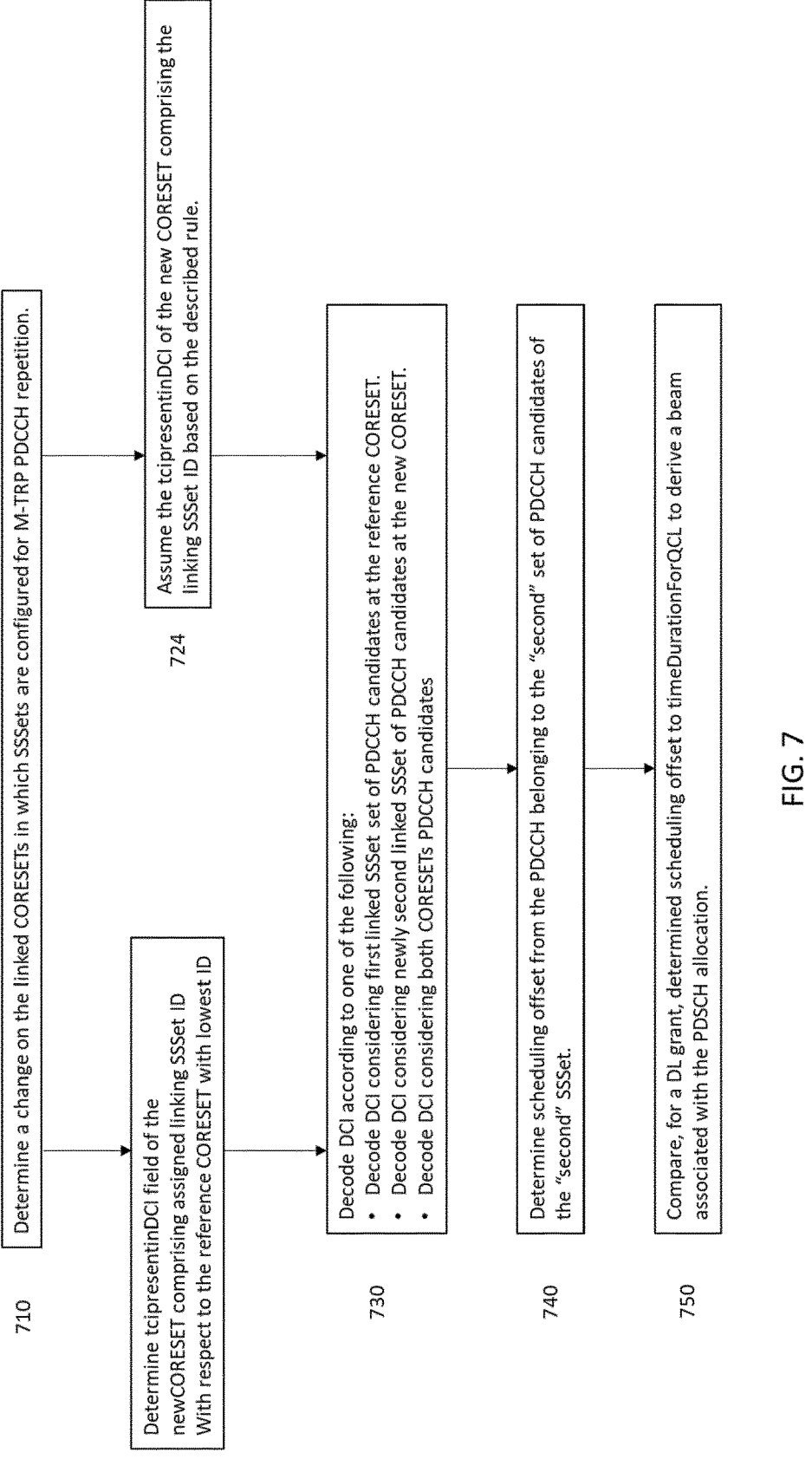

FIG. 7

710 — Determine a change on the linked CORESETs in which SSSets are configured for M-TRP PDCCH repetition.

722 — Determine tcipresentinDCI field of the newCORESET comprising assigned linking SSSet ID With respect to the reference CORESET with lowest ID 724 — Assume the tcipresentinDCI of the new CORESET comprising the linking SSSet ID based on the described rule.

730 — Decode DCI according to one of the following:
• Decode DCI considering first linked SSSet set of PDCCH candidates at the reference CORESET.
• Decode DCI considering newly second linked SSSet of PDCCH candidates at the new CORESET.
• Decode DCI considering both CORESETs PDCCH candidates 740 — Determine scheduling offset from the PDCCH belonging to the "second" set of PDCCH candidates of the "second" SSSet.

750 — Compare, for a DL grant, determined scheduling offset to timeDurationForQCL to derive a beam associated with the PDSCH allocation.

900

DYNAMIC SEARCH SPACE SET LINKING

RELATED APPLICATION

This application was originally filed as PCT Application No. PCT/EP2022/057403 on Mar. 22, 2022, which claims priority from EP Application Serial No. 21166904.9, filed on Apr. 6, 2021, each of which is incorporated herein by reference in its entirety.

FIELD

The following exemplary embodiments relate to wireless communication and to a design of a physical layer.

BACKGROUND

Wireless communication enables connectivity for various types of terminal devices. A physical layer of the wireless connectivity may carry signalling messages and data in physical channels. For example, scheduling of uplink grants and downlink assignments may be carried in the physical channels. To be able to efficiently perform the signalling helps to improve the wireless communication and save resources of a terminal device.

BRIEF DESCRIPTION

The scope of protection sought for various embodiments is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising at least one processor, and at least one memory including a computer program code, wherein the at least one memory and the computer program code are configured, with the at least one processor, to cause the apparatus to obtain information regarding a linkage of a first search space set and a second search space set, wherein the first search space set and the second search space set are associated with a multi transmission reception point physical downlink control channel repetition, determine, based on the obtained information, that the first search space set and the second search space set are linked search space sets, determine for the linked search space sets a presence information of a transmission configuration indication, and based on the presence information, determine a field size of the transmission configuration indication in a downlink control information for the multiple transmission reception point physical downlink control channel repetition.

According to a second aspect there is provided an apparatus comprising means for obtaining information regarding a linkage of a first search space set and a second search space set, wherein the first search space set and the second search space set are associated with a multi transmission reception point physical downlink control channel repetition, determining, based on the obtained information, that the first search space set and the second search space set are linked search space sets, determining for the linked search space sets a presence information of a transmission configuration indication, and based on the presence information, determining a field size of the transmission configuration indication in a downlink control information for the multiple transmission reception point physical downlink control channel repetition.

According to a third aspect there is provided a method comprising obtaining information regarding a linkage of a first search space set and a second search space set, wherein the first search space set and the second search space set are associated with a multi transmission reception point physical downlink control channel repetition, determining, based on the obtained information, that the first search space set and the second search space set are linked search space sets, determining for the linked search space sets a presence information of a transmission configuration indication, and based on the presence information, determining a field size of the transmission configuration indication in a downlink control information for the multiple transmission reception point physical downlink control channel repetition.

According to a fourth aspect there is provided a computer program comprising instructions for causing an apparatus to perform at least the following: obtain information regarding a linkage of a first search space set and a second search space set, wherein the first search space set and the second search space set are associated with a multi transmission reception point physical downlink control channel repetition, determine, based on the obtained information, that the first search space set and the second search space set are linked search space sets, determine for the linked search space sets a presence information of a transmission configuration indication, and based on the presence information, determine a field size of the transmission configuration indication in a downlink control information for the multiple transmission reception point physical downlink control channel repetition.

According to a fifth aspect there is provided a computer program product comprising instructions for causing an apparatus to perform at least the following: obtain information regarding a linkage of a first search space set and a second search space set, wherein the first search space set and the second search space set are associated with a multi transmission reception point physical downlink control channel repetition, determine, based on the obtained information, that the first search space set and the second search space set are linked search space sets, determine for the linked search space sets a presence information of a transmission configuration indication, and based on the presence information, determine a field size of the transmission configuration indication in a downlink control information for the multiple transmission reception point physical downlink control channel repetition.

According to a sixth aspect there is provided a computer program comprising instructions stored thereon for performing at least the following: obtain information regarding a linkage of a first search space set and a second search space set, wherein the first search space set and the second search space set are associated with a multi transmission reception point physical downlink control channel repetition, determine, based on the obtained information, that the first search space set and the second search space set are linked search space sets, determine for the linked search space sets a presence information of a transmission configuration indication, and based on the presence information, determine a field size of the transmission configuration indication in a downlink control information for the multiple transmission reception point physical downlink control channel repetition.

According to a seventh aspect there is provided a non-transitory computer readable medium comprising program instructions for causing an apparatus to perform at least the following: obtain information regarding a linkage of a first search space set and a second search space set, wherein the first search space set and the second search space set are associated with a multi transmission reception point physical downlink control channel repetition, determine, based on the obtained information, that the first search space set and the second search space set are linked search space sets, determine for the linked search space sets a presence information of a transmission configuration indication, and based on the presence information, determine a field size of the transmission configuration indication in a downlink control information for the multiple transmission reception point physical downlink control channel repetition.

According to an eight aspect there is provided non-transitory computer readable medium comprising program instructions stored thereon for performing at least the following: obtain information regarding a linkage of a first search space set and a second search space set, wherein the first search space set and the second search space set are associated with a multi transmission reception point physical downlink control channel repetition, determine, based on the obtained information, that the first search space set and the second search space set are linked search space sets, determine for the linked search space sets a presence information of a transmission configuration indication, and based on the presence information, determine a field size of the transmission configuration indication in a downlink control information for the multiple transmission reception point physical downlink control channel repetition.

LIST OF DRAWINGS

In the following, the invention will be described in greater detail with reference to the embodiments and the accompanying drawings, in which FIG. 1 illustrates an exemplary embodiment of a radio access network.

FIG. 4-FIG. 7 illustrate an exemplary embodiments of using a reference control resource set.

DESCRIPTION OF EMBODIMENTS

Figure 1:
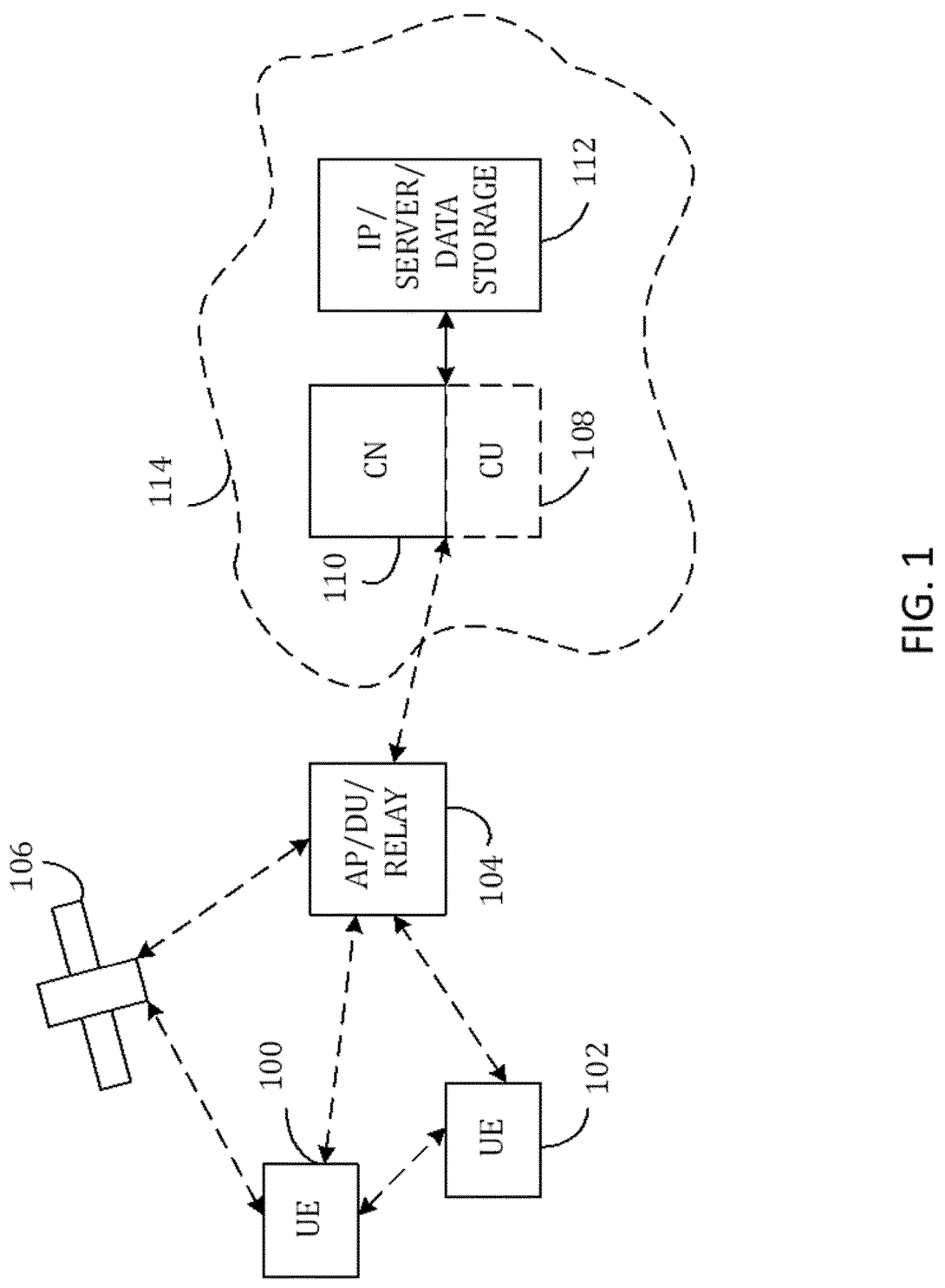

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

As used herein, the term "determining" (and grammatical variants thereof) may include, as a non-exhaustive listing, for example calculating, computing, processing, deriving, measuring, investigating, looking up (e.g., looking up in a table, a database or another data structure), ascertaining and the like. Also, "determining" may include receiving (e.g., receiving information), accessing (e.g., accessing data in a memory), obtaining and the like. Also, "determining" may include resolving, selecting, choosing, establishing, and the like.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), or a user plane function (UPF), for providing connectivity of terminal devices (UEs) to external packet data networks, or mobile management entity (MME), or access and mobility function (AMF) for access and mobility management.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. A terminal device may also be a device having capability to operate in Internet of Things (IoT) network.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require to bring the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Satellite communication may utilise geostationary earth orbit (GEO) satellite systems, but also low earth orbit (LEO) satellite systems, for example, mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc.

In a wireless communication system, such as a cellular communication network, data and signalling messages may be carried in DL and UL physical channels. An example of such a channel is a physical downlink control channel, PDCCH, which is used for scheduling DL assignments and/or UL scheduling grants. Downlink control information, DCI, which comprises the scheduling information for the DL and UL data channels and/or other control information, is carried in the PDCCH. DCI may be for one terminal device or for a plurality of terminal devices.

Figure 2:
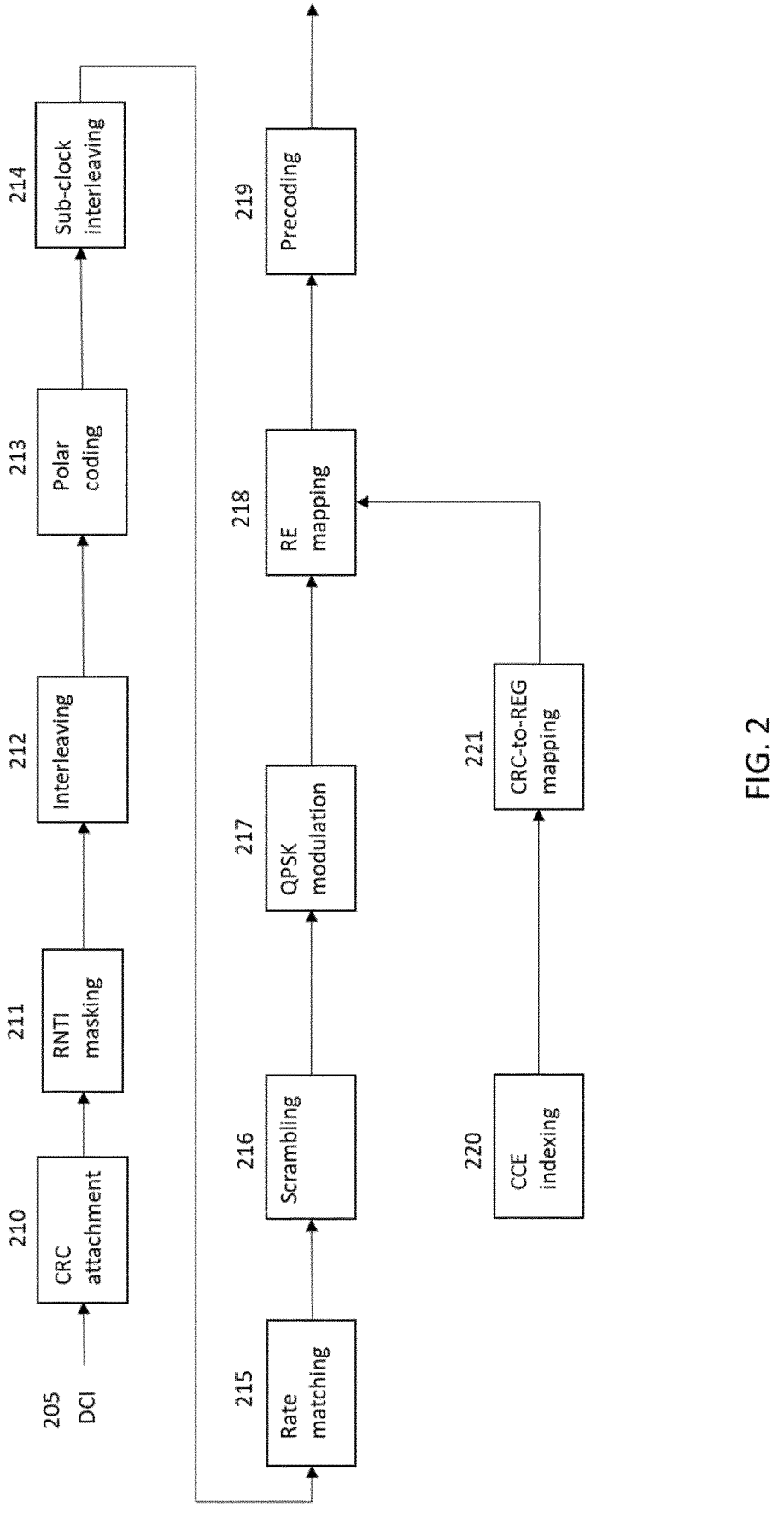
FIG. 2 illustrates an exemplary embodiment of a procedure for generating a PDCCH from a DCI.

FIG. 2 illustrates an exemplary embodiment of a procedure for generating a PDCCH from a DCI. It is to be noted that the blocks in FIG. 2 are logical blocks and the implementation may be any suitable implementation. At first, a DCI 205 is obtained. If the size of the DCI format is less than 12 bits, a few zero padding bits will be appended until the payload size equals 12 bits. Next, in block 210, a cyclic redundancy check, CRC is determined and attached to the DCI payload. In this exemplary embodiment, a 24-bit CRC is determined. The CRC allows a terminal device receiving the payload to detect the presence of errors in the decoded DCI payload bits. Next in block 211, the last 16 bits of the CRC are masked with a corresponding identifier, such as a radio network temporary identifier, RNTI. The RNTI enables the receiving terminal device to detect the DCI for its unicast data as well as distinguish different sets of DCI with different purposes that have the same payload size. Next, in block 212, the CRC attached bits are interleaved to distribute the CRC bits among the information bits. In this exemplary embodiment, the interleaving is supported up to a maximum input size of 164 bits. Thus, a DCI without CRC may have at most 140 of payload bits in this exemplary embodiment. Next, in block 213, the bits are encoded using a Polar encoder to protect the DCI against errors during transmission, after which, in block 214, the output of the Polar encoding is processed using a sub-block interleaving and then in block 215 rate matched to fir the allocated payload resource elements, RE, of the DCI. In block 216 the payload bits of each DCI are separately scrambled for example using a scrambling sequence generated from a length-31 Gold sequence. The scrambling sequence may be initialized by the physical layer cell identity of the cell or by a terminal device specific scrambling identity and a terminal device specific cell RNTI, C-RNTI. Next, in block 217, a quadrature phase shift keying, QPSK, modulation is performed on the scrambled DCI bit sequence, and in block 218 the complex-valued modulation symbols are mapped to physical resources in units referred to as control channel elements, CCEs. A CCE may comprise six resource element groups, REGs, in which a REG may be defined as one physical resource block, PRB, in one orthogonal frequency division multiplexing, OFDM, symbol comprising nine REs for the PDCCH payload and three demodulation reference signal, DRMS, REs. For example, for a DCI, 1, 2, 4, 8, or 16 CCEs may be allocated. The number of CCEs for a DCI may be understood as an aggregation level, AL. With QPSK modulation, a CCE may comprise 54 payload REs and thus may carry 108 bits. This may require the output size of the rate matching block to be $L \cdot 108$, in which L is the associated AL. Based on the channel environment and available resources, an access node, such as a gNB performing the transmission, may adaptively choose a proper AL for a DCI to adjust the code rate. Thus, as illustrated in FIG. 2, block 221, a CCE indexing block and block 222, a CCE-to-REG mapping block, may also provide input to the block 218. Finally, in block 219, precoding is performed.

A bandwidth part, BPW, may be understood as a subset of contiguous common PRBs. A terminal device may be configured with, for example, up to four BWPs in the uplink or four BWPs in the downlink. A DCI with AL L may be mapped to physical resources in a given BWP, in which parameters such as frequency and time-domain resources, and scrambling sequence identity for the DMRS for the PDCCH are configured to the terminal device by a control resource set, CORESET. The terminal device may be configured with, for example, up to three or five CORESETs on each of up to, for example, four BWPs on a serving cell. For example, a CORESET may be configured in units of six PRBs on a six PRB frequency grid and one, two, or three consecutive OFDM symbols in the time domain.

A DCI of AL L thus comprises L continuously numbered CCEs, and the CCEs may be mapped on a number of REGs in a CORESET. Further, in 5G, a distributed and localized resource allocation for a DCI in a CORESET is supported. This may be achieved by configuring interleaved or non-interleaved CCE-to-REG mapping for each CORESET. For interleaved CCE-to-REG mapping, REG bundles comprised in the CCEs for a PDCCH are distributed in the frequency domain in units of REG bundles. A REG bundle may be understood as a set of indivisible resources comprising neighbouring REGs. A REG bundle may span across all OFDM symbols for the given CORESET. As the REGs corresponding to a PDCCH are determined, the modulated symbols of the PDCCH may be mapped to the REs of the determined REGs in the frequency domain first and in the time domain second, that is, in increasing order of the RE index and symbol index, respectively.

The terminal device then performs blind decoding for a set of PDCCH candidates. PDCCH candidates to be monitored may be configured for the terminal device using of search space, SS, sets. The SS set may have different types such as a common SS, CSS, set, which is commonly monitored by a group of terminal devices in the cell, and a terminal device specific SS, UE specific SS, USS, set, which is monitored by an individual terminal device. A terminal device may be configured with, for example, up to 10 SS sets each for up to four BWPs in a serving cell. In general, SS set configuration may provide a terminal device with the SS set type, such as a CSS set or a USS set, DCI format(s) to be monitored, monitoring occasion, and the number of PDCCH candidates for each AL in the SS set.

A SS set with index s may be associated with a, and in some examples with only one, CORESET with index p. The terminal device may then determine a slot for monitoring the SS set with the index s based on higher layer parameters for periodicity k, offset o, and duration d, where periodicity k and offset o provide a starting slot and duration d may provide the number of consecutive slots where the SS set is monitored starting from the slot identified by k and o.

The mapping of PDCCH candidates of an SS set to CCEs of the associated CORESET may be implemented for example by using a hash function. The hash function then randomizes the allocation of the PDCCH candidates within CORESET. The PDCCH may be repeated in the time, frequency, and/or spatial domain. The PDCCH repetitions may comprise the same DCI content and have the same AL or, alternatively, may have the same DCI content, but different AL. For PDCCH repetitions, supporting linking of two SS sets by an RRC configuration may be beneficial. To achieve such support, if the terminal device is monitoring two linked SS sets, the terminal device may not be expected to monitor a third SS set to be linked with one or both of the two linked SS sets. The two linked SS sets may have the same SS set type (USS/CSS) and/or the same DCI formats to monitor. To enable intra-slot PDCCH repetition, the two linked SS sets may have the same periodicity and offset, which may be denoted as monitoringSlotPeriodicityAndOff- set, and the same duration. To enable linking monitoring occasions across the two linked SS sets that exist in the same slot, the two SS sets may have the same number of moni- toring occasions within a slot and n-th monitoring occasion of one SS set may be linked to an n-th monitoring occasion of the other SS set. Thus, based on that, an RRC level association may be defined between two SS sets to link PDCCH candidates of the SS sets. The terminal device may then combine, using for example soft or selection combin- ing, PDCCH candidates of the associated SS sets in different CORESETs.

To configure a time/frequency CORESET searching for DL control information, an information element, IE, may be configured by radio resource control, RRC. This may be performed for example in accordance with a specification such as the 3GPP specification TS 38.213, Section 10.1. For example, in accordance with this specification, along with CORESET and CCEs resource allocation TCI-PresentInDCI indicates if a transmission coordination indication, TCI, field is present or absent in a DL-related DCI. When the field is absent, the terminal device determines the TCI to be dis- abled. Another indication, TCI-StatesPDCCH-ToAddList, indicates a subset of the TCI states defined in PDSCH- CONFIG included in the BWP-DownlinkDedicated corre- sponding to the serving cell and to the DL BWP to which the ControlResourceSet belong to. As such, TCI-state for PDCCH may be applied via selecting a subset of the tables from TCI-StatesPDCCH-ToAddList and putting them into ControlResourceSet.tci-StatesPDCCH-ToAddList. TCI- State indication may be performed for each terminal device via MAC-CE. If TCI-PresentInDCI is set as 'Enabled' for the CORESET scheduling the PDSCH, a smaller subset from TCI-StatesPDCCH-ToAddList is selected and will be put into a smaller size codepoint. This smaller table is done by TCI states Activation/Deactivation for terminal device- specific PDSCH MAC-CE. Thus, for each PDSCH sched- uling, the TCI field in DCI1_1 may indicate a specific index of the smaller table mentioned above.

Figure 3:
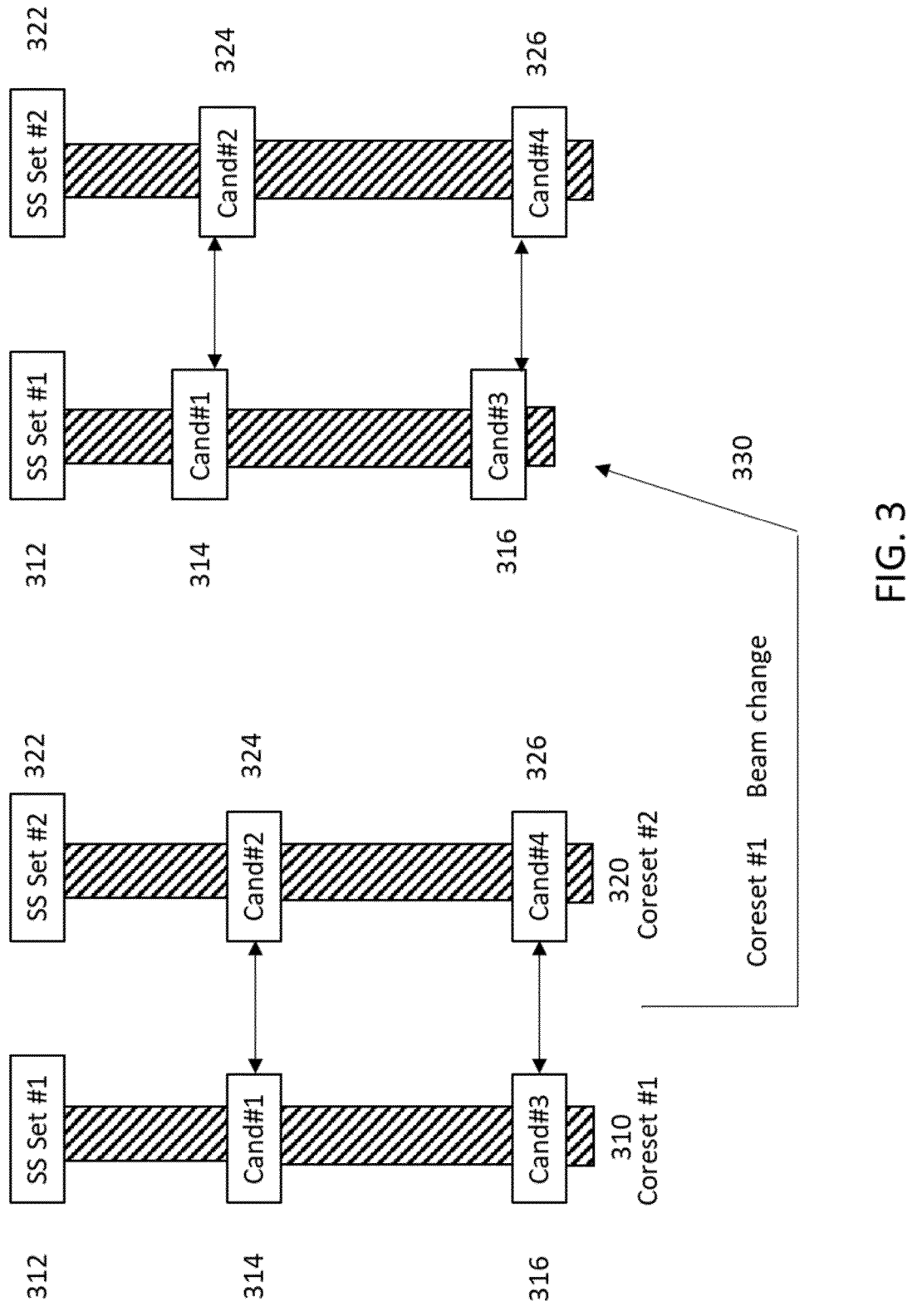
FIG. 3 illustrates an exemplary embodiment of linked SS sets.

To enable support for explicit linking between two PDCCH candidates in two different SS sets, the two SS sets may be linked. As such, monitoring occasions, MOs, of the first SS set may be linked with MOs of the second SS set. PDCCH candidates of the first SS set may therefore be linked with PDCCH candidates of the second SS set. Link- ing two SS sets may require configurations, while linking MOs and PDCCH candidates may be either based on configuration or a rule. For the case of rule-based, one-toone mapping may simplify the procedures for linking between different PDCCH candidates within a given pair linked monitoring occasions. Yet, this may require some SSset configuration restrictions when the two SS sets are used for PDCCH repetition. For example, if 2 CORESETS carrying 2 beams in which each beam represents each transmission and reception point, TRP, a terminal device may receive a repetition and the SS sets are associated with their corresponding CORESETs. This is illustrated in FIG. 3 in which there is a first CORESET 310 and a second CORESET 320. The first CORESET 310 comprises a first SS set 312, a first PDCCH candidate 314 and a third PDCCH candidate 316. The second CORESET 320 comprises a second SS set 322, a second PDCCH candidate 324 and a fourth PDCCH candidate 326. The CORESET beam change is illustrated as 330. In the case the SS set association due to CORESET beam change 330 is required, medium access control control element, MAC-CE, may be used to update the beams. If there should be a connection to the third TRP, SS sets association is not changed. Thus, it is required is to keep the linked SS sets associations while the association between CORESETs could be dynamically changes.

It may be the case that blind decoding is performed when 2 SS sets corresponding to 2 different CORESETs are linked and the association between CORESETs is changed. For example, if there are 2 linked SS sets associated with 2 different CORESETs, BD may be counted more than once for decoding the same PDCCH candidate due to multiple assumptions that the terminal device does consider selective/ combined decoding. In other words, BDs for the same DCI may be counted twice for each linked SS sets which may lead to reducing the available BDs for other PDCCH can- didates within other SS sets. Thus, it is beneficial to avoid such blind decoding and the exemplary embodiments dis- cussed below introduce solutions that do not require such blind decoding.

In order to reduce blind decoding performed by a terminal device when the change on CORESETs association occurs, the terminal device may be caused to perform a procedure to determine a size of a TCI field comprised in the DCI of linked SS sets for a PDCCH repetition. The same DCI may be repeated via multiple SS sets that are associated with multiple CORESETs. In an exemplary embodiment, it may be determined that an RRC parameter regarding the TCI, such as tcipresentinDCI, has configuration in a first SS set that differs from that of the second SS set, when the first and the second SS sets are linked SS sets. Since the linkage between the two SS sets is to be kept unchanged, the terminal device may obtain information regarding this link- age from a network node such as an access node. Based on this determination, a reference CORESET, which may also comprise a CORESET corresponding to a reference SS Set, may be defined to determine a third RRC parameter regard- ing TCI, such as a third tcipresentinDCI, which may be used for the determining the size of the TCI field comprised in the DCI. The reference CORESET may be defined for example based on semi-static RRC CORESET or SS Set configura- tion parameters or based on dynamic parameters associated with the CORESET or SS Sets. Such dynamic parameters may be based on MAC-CE and may include beam update, SS set linking, etc.

If a semi-static RRC CORESET, or SS set, configuration parameters are to be used, the CORESET with the lowest ID of the linked SS sets may be selected as the reference CORESET to determine the size of the TCI field comprised in the DCI. Alternatively, the SS set with the highest ID, or a pre-defined ID, of the linked SS sets may be selected as the reference SS set. If, on the other hand, dynamic parameters associated with CORESET or SS sets are to be used, the reference CORESET may be determined based on one or more of the following:

The MAC-CE may indicate the reference CORESET, or alternatively SS sets reference, to derive the field size for the parameter regarding TCI such as tcipresentin-DCI, comprised in the DCI. Optionally, the first SS set indicated in MAC-CE may be used as the reference CORESET or SS set reference.

The MAC-CE may indicate a beam update for the CORE-SET, and the terminal device may use that CORESET, among the linked CORESETs, as a reference to derive the field size for the parameter regarding TCI, such as tcipresentinDCI, comprised in the DCI. Optionally, if the CORESET MAC-CEs are received simultaneously, the update with the lowest CORESET ID may be used as the reference.

In another exemplary embodiment, it may also be determined that the RRC parameter regarding TCI, such as tcipresentinDCI, has configuration in a first SS set that differs from that of the second SS set, when the first and the second SS sets are linked SS sets. However, in this exemplary embodiment, the terminal device now determines the parameter regarding size determination of the field size of the TCI comprised in the DCI based on a pre-defined rule. The pre-defined rule may be for example the following: If at least one CORESET of linked CORESETs, via SS set linking, has the parameter regarding TCI enabled, for example tcipresentinDCI='enabled', the terminal device interprets the parameter regarding TCI being enabled for the size determination of the TCI field comprised in the DCI. Otherwise, the terminal device interprets the parameter regarding TCI as disabled, for example tcipresentinDCI='disabled', for the determination of the sized of the TCI field comprised in the DCI. Additionally, the latest beam update received CORESET among linked CORESETs may overwrite the above rules. For example, if the CORESET with beam update has tcipresentinDCI='disabled', the tcipresentinDCI='enabled' in the other CORESET may not enable the terminal device interpreting the tcipresentinDCI='enabled' for determination of the size of the TCI field comprised in the DCI.

In some exemplary embodiments, the terminal device may be configured by an network node, such as an access node or other a function from the core network, such that the terminal device by default interprets the parameter regarding TCI as disabled, for example tcipresentinDCI='disabled' for all CORESETS if MAC-CE based SS set linking is enabled, or for linked CORESETs if RRC linking is applied. Alternatively, the terminal device may, by default, interpret the parameter regarding TCI as enabled, for example tcipresentinDCI='enabled' for all CORESETS if MAC-CE based SS set linking is enabled, or for linked CORESETs if RRC linking is applied. Such default interpretations may be utilized for example when specific DCI formats are used.

It is to be noted that the exemplary embodiments defined above may be applicable for both scenarios of linking SS sets, those that are RRC based and those that are MAC-CE based.

In an exemplary embodiment in which dynamic linking of SS sets is supported, for example when the SS sets are linked based on MAC-CE, a terminal device may determine a validity of multi TRP, M-TRP, PDCCH repetitions. The MAC-CE may have a field to indicate the validity of linking SS Sets. This indication may be used to disable multi TRP PDCCH repetitions. Alternatively, the terminal device may receive the same SS set ID as linked SS sets, and thus determine that multi TRP PDCCH repetitions is not valid. Further alternatively, if linking between SS sets is determined as not valid and thus multi TRP PDCCH repetitions is not to be applied, the terminal device may apply single TRP PDCCH candidate monitoring. It is to be noted that determining validity of M-TRP PDCCH repetitions mode may comprise an indication indicating disabling that mode.

Figure 4:
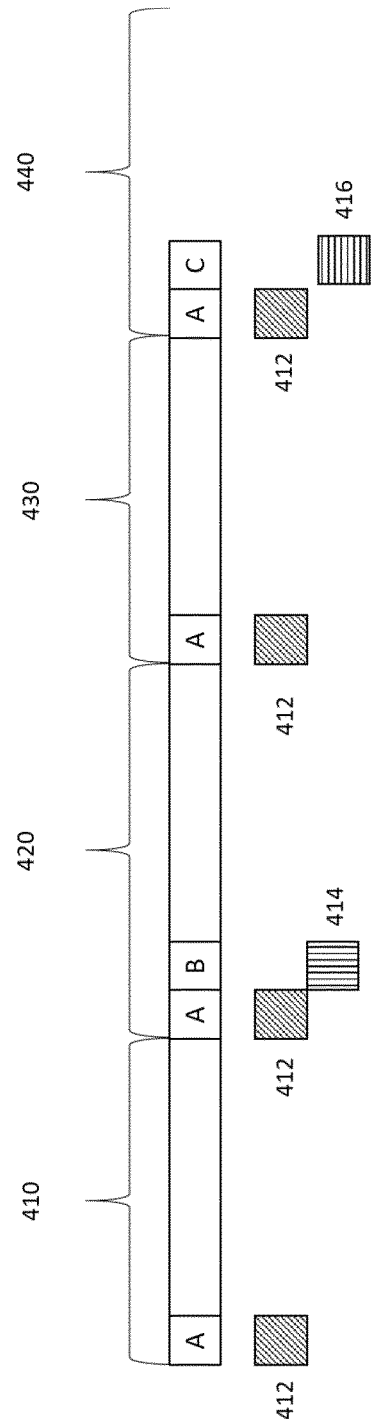

FIG. 4 illustrates an exemplary embodiment for a reference CORESET and using the reference CORESET to determine a field size of a TCI comprised in a DCI. It is to be noted that also a presence information of the TCI may be determined. The presence information may be determined for example as enabled or disabled. In this exemplary embodiment, a terminal device interprets one CORESET as a reference CORESET and uses that to determine the field size of the TCI comprised in the DCI. In this exemplary embodiment there is a CORESET A 402 that is associated with a SS set 1 and a CORESET B 404 that is associated with a SS set 2. There are four transmission slots 410, 420, 430 and 440 during which multi-TRP PDCCH repetitions may occur. In this exemplary embodiment, CORESET A is indicated with a lower ID than the CORESET B. There is also a PDCCH candidate 412 of linked SS set 1 in CORE-SET A with parameter regarding TCI as disabled, for example tcipresentinDCI='disabled', a PDCCH candidate 414 of linked SS set 2 in CORESET B and a PDCCH candidate 416 of linked SS set 3 in CORESET C with the parameter regarding TCI as disabled, for example tcipresentinDCI='disabled'. As the new CORESET C is detected in slot 440, the dynamic linking between SS set 1 and SS set 2 requires the parameter regarding TCI to be configured as disabled, for example tcipresentinDCI='disabled' as it is determined that the CORESET A carries the lowest CORESET ID.

In another exemplary embodiment, if tcipresentinDCI configurations of the new, updated CORESET comprising the linking SS set ID and the other existing linking CORE-SET are different, the tcipresentinDCI configurations of the new CORESET may be defined based on the following rules:

If tcipresentinDCI='enabled' in the existing CORESET, the terminal device interprets tcipresentinDCI='enabled' in the new CORESET.

If tcipresentinDCI='disabled' in the existing CORESET, the terminal device interprets tcipresentinDCI='disabled' in the new CORESET. It may further be that no beam is indicated for PDSCH and the default beam for both CORESETs is assumed.

Figure 5:
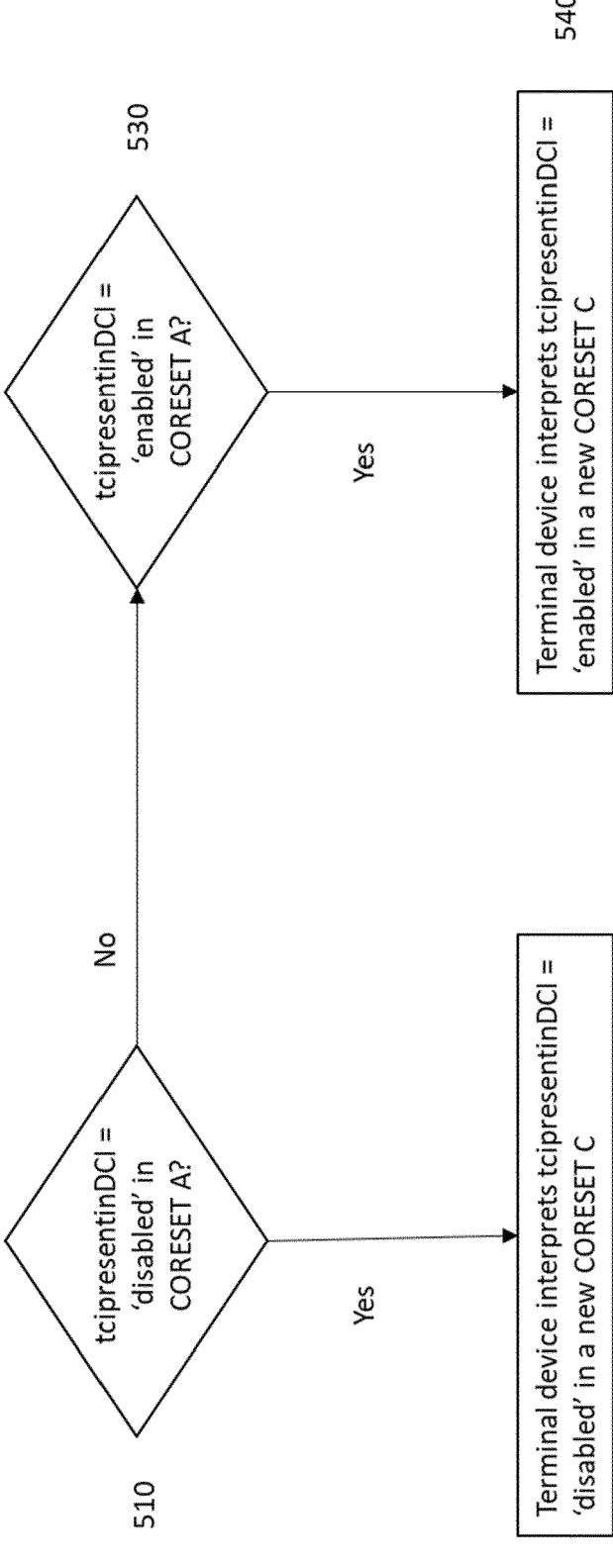

FIG. 5 illustrates an exemplary embodiment of using an existing CORESET as the reference for determining the size of a TCI field when a new CORESET is dynamically linked. First, in 510 it is determined if the parameter regarding TCI is disabled in a first CORESET, such as a CORESET A. If it is not, then in 510 it is determined if the parameter regarding TCI is enable in the first CORESET. If it is, then the terminal device interprets, in 540, the parameter regarding TCI to be enabled in a new CORESET, that may be CORESET C. On the other hand, if it is determined in 510 that the parameter regarding TCI is disabled in a first CORESET, then in 530 the terminal device interprets the parameter regarding TCI to be disabled in the new CORE-SET.

Figure 6:
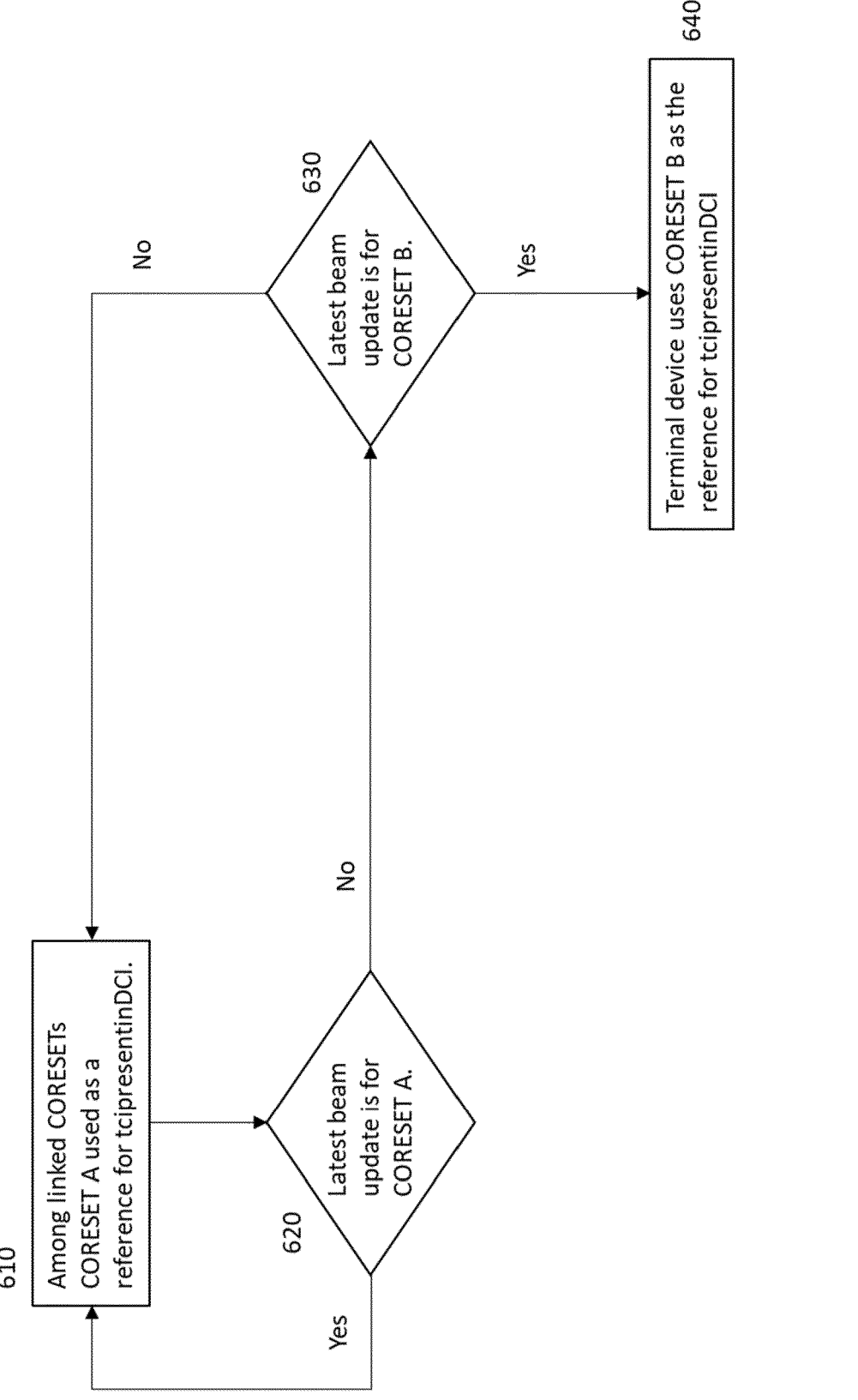

FIG. 6 illustrates an exemplary embodiment of using an updated CORESET obtained from a beam as a reference CORESET for determining the field for the TCI. In this exemplary embodiment, in 610, there are two linked CORE- SETs, CORESET A and CORESET B, and the CORESET A is used as the reference for the parameter regarding TCI such as the tcipresentinDCI. In 620, it is then determined if a beam update, that is the latest beam update, is for the CORESET A. If it is, then the process returns to 610 and the CORESET A is still used as a reference for determining the field of TCI. On the other hand, if the latest beam update is not for the CORESET A, then in 630 it is determined if the beam update is for the CORESET B. If it is not, then the process again returns to 610. On the other hand, if it is, then the process proceeds to 640 in which the terminal device now used the CORESET B as the reference for determining the field of TCI.

In another exemplary embodiment, an access node such as a gNB may configure the parameter regarding the TCI such that it is for example either tcipresentinDCI='disabled' or tcipresentinDCI='enabled' as 'disabled' for all CORESETs in case MAC-CE based SS set linking is allowed. Alternatively, the parameter regarding TCI is configured for the linked CORESETs, in case RRC linking is utilized, in both RRC based and MAC-CE based linking of the SS sets. This may be beneficial as the terminal device then does not have any confusion regarding determining the DCI size.

FIG. 7 illustrates a flow chart according to an exemplary embodiment in which dynamic linking of SS sets is supported and used. The dynamic linking may be based on for example MAC-CE. In this exemplary embodiment, the terminal device determined validity for the M-TRP PDDCH repetitions. First in 710 the terminal device determines that there is change on the linked CORESETS in which SS sets are configured for the M-TRP PDCCH repetitions. The change on the linked CORESETs may comprise for example switching from a second CORESET to a third CORESET. Next, there are two options. In the first alternative 722 the terminal device determines that a field of a parameter regarding TCI, such as tcipresentinDCI field, of the new CORESET comprises an assigned linking SS set ID with respect to the reference CORESET with the lowest ID. Alternatively, in the second option 724, the terminal device determines the field of a parameter regarding TCI, such as tcipresentinDCI field, of the new CORESET comprising the linking SS set ID based on a pre-determined rule. After both options, the procedure moves on to 730 in which the terminal device decodes DCI based on one of the following:

DCI is decoded using the first linked SS set of PDCCH candidates as the reference CORESET.

DCI is decoded using an obtained second linked SS set of PDCCH candidates as the new CORESET.

DCI is decoded using the first and the second CORESETs as PDCCH candidates, in other words, using soft combining.

Then in 740, to perform a successful decoding, the terminal device may determine a scheduling offset from the PDCCH that is comprised in the second set of PDCCH candidates of the second SS set. Finally, in 750, for DL grant, that is for a PDSCH allocation, the terminal device compares the above determined scheduling offset to a PDSCH allocation, that may be indicated using for example the parameter timeDurationForQCL, to derive the beam associated with the PDSCH allocation.

In general, the exemplary embodiment described above allow dynamic linking of SS sets for multi TRP PDCCH repetitions. A network node may defines a mapping between the SS sets, which may be associated with multiple CORESETs and indicates this using indications, such as dynamic indications, to a terminal device via for example MAC-CE in case of PDCCH repetitions and CORESET beam change. The terminal device determines a reference CORESET based on the mapping received from the network for multi TRP PDCCH repetitions. The terminal device then decodes DCI using the determined reference CORESET.

The exemplary embodiments described above may have various benefits such as avoiding unnecessary blind decoding when two SS sets corresponding to two different CORESETs are linked. The linking may be for example through using MAC-CE. Additionally, the exemplary embodiments described above may help to avoid reducing the available blind decoding for other PDCCH candidates within other PDCCH candidates comprised in other SS sets. Additionally, the exemplary embodiments described above enable using a set of assumptions, for example, to define relationship between SS sets associated with 2 CORESETs using MAC-CE when PDCCH repetition and CORESET beam changes are applied.

Figure 8:
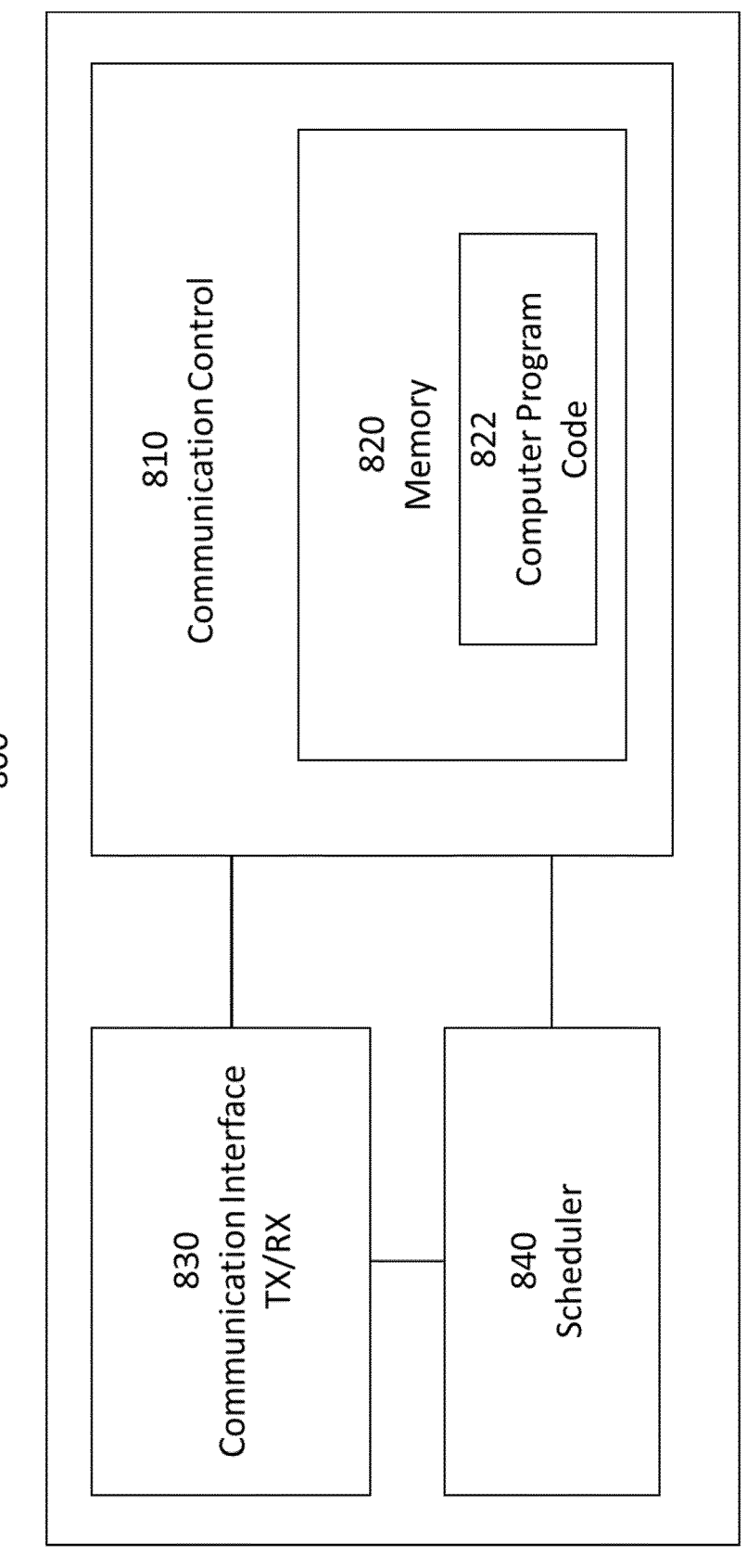
FIG. 8 and FIG. 9 illustrate exemplary embodiments of an apparatus.

The apparatus 800 of FIG. 8 illustrates an example embodiment of an apparatus that may be an access node or be comprised in an access node. The apparatus may be, for example, a circuitry or a chipset applicable to an access node to realize the described embodiments. The apparatus 800 may be an electronic device comprising one or more electronic circuitries. The apparatus 800 may comprise a communication control circuitry 810 such as at least one processor, and at least one memory 820 including a computer program code (software) 822 wherein the at least one memory and the computer program code (software) 822 are configured, with the at least one processor, to cause the apparatus 800 to carry out any one of the example embodiments of the access node described above.

The memory 820 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 800 may further comprise a communication interface 830 comprising hardware and/or software for realizing communication connectivity according to one or more communication protocols. The communication interface 830 may provide the apparatus with radio communication capabilities to communicate in the cellular communication system. The communication interface may, for example, provide a radio interface to terminal devices. The apparatus 800 may further comprise another interface towards a core network such as the network coordinator apparatus and/or to the access nodes of the cellular communication system. The apparatus 800 may further comprise a scheduler 840 that is configured to allocate resources.

Figure 9:
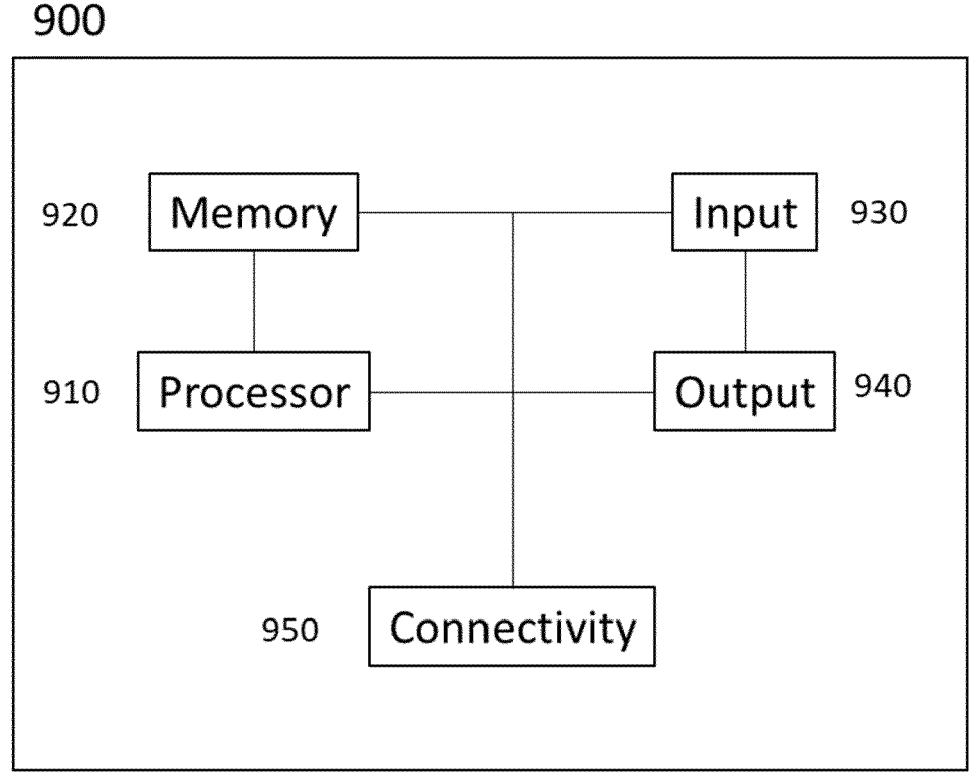

FIG. 9 illustrates an exemplary embodiment of an apparatus that may be comprised in, or connected to, a terminal device that may be a redcap terminal device. A receiving and/or transmitting unit as described above, may be comprised in the device as well. The apparatus 900 comprises a processor 910. The processor 910 interprets computer program instructions and process data. The processor 910 may comprise one or more programmable processors. The processor 910 may comprise programmable hardware with embedded firmware and may, alternatively or additionally, comprise one or more application specific integrated circuits, ASICs.

The processor 910 is coupled to a memory 920. The processor is configured to read and write data to and from the memory 920. The memory 920 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 920 stores computer readable instructions that are execute by the processor 910. For example, non-volatile memory stores the computer readable instructions and the processor 910 executes the instructions using volatile memory for temporary storage of data and/or instructions.

The computer readable instructions may have been pre-stored to the memory 920 or, alternatively or additionally, they may be received, by the apparatus, via electromagnetic carrier signal and/or may be copied from a physical entity such as computer program product. Execution of the computer readable instructions causes the apparatus 900 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 900 further comprises, or is connected to, an input unit 930. The input unit 930 comprises one or more interfaces for receiving a user input. The apparatus 900 also comprises an output unit 940. The apparatus 900 may further comprise a connectivity unit 950. The connectivity unit 950 enables wired and/or wireless connectivity to external networks. The connectivity unit 950 may comprise one or more antennas and one or more receivers that may be integrated to the apparatus 900 or the apparatus 900 may be connected to. The connectivity unit 950 may comprise an integrated circuit or a set of integrated circuits that provide the wireless communication capability for the apparatus 900. Alternatively, the wireless connectivity may be a hardwired application specific integrated circuit, ASIC.

It is to be noted that the apparatus 900 may further comprise various component not illustrated in the FIG. 9. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory including a computer program code, wherein the at least one memory and the computer program code are configured, with the at least one processor, to cause the apparatus to:

obtain information regarding a linkage of a first search space set and a second search space set, wherein the first search space set and the second search space set are different search spaces and are associated with a multi transmission reception point physical downlink control channel repetition, and the first search space is associated with a first transmission reception point and the second search space is associated with a second transmission reception point;

determine, based on the obtained information, that the first search space set and the second search space set are linked search space sets, and the linking is based on radio resource control configuration or a medium access control element;

determine, for the linked search space sets, a presence information of a transmission configuration indication, wherein the presence information indicates if the transmission configuration indication is enabled or disabled; and based on the presence information, determine a field size of the transmission configuration indication in a downlink control information for the multiple transmission reception point physical downlink control channel repetition, wherein the apparatus is further caused to receive, from a network node, an indication indicating a validity of the linkage.

2. The apparatus according to claim 1, wherein the presence information is determined based on a pre-determined rule or a pre-determined default value.

3. The apparatus according to claim 1, wherein the first search space set is associated with a first control resource set and the second search space set is associated with a second control resource set and wherein the apparatus is further caused to:

determine if a configuration for the presence information is the same in the first and the second control resource sets; and, determine, for the linked search space sets, and based on the determination, the presence information of the transmission configuration indication.

4. The apparatus according to claim 3, wherein the apparatus is further caused to:

determine a reference control resource set based on determining that the configuration for the presence information is not the same in the first and the second control resource sets; and determine, for the linked search space sets, and based on the reference control set, the presence information of the transmission configuration indication.

5. The apparatus according to claim 4, wherein the reference control resource set is defined based on radio resource control parameters or based on medium access control element parameters.

6. The apparatus according to claim 4, wherein the apparatus is further caused to:

determine if the first or the second control resource set has a lowest identifier (ID) and further determine the reference control resource set to be the control resource set that has the lowest ID; or determine if the first or the second control resource set has a highest ID, and further determine the reference control resource set to be the control resource set that has the highest ID.

7. The apparatus according to claim 4, wherein the reference control set comprises a control set corresponding to a reference search space set.

8. The apparatus according to claim 4, wherein the apparatus is further caused to:

receive, from a network node, a first dynamic indication to change the presence information of the transmission configuration indication associated with the first control resource set or with the second control resource set; and updating the control resource set to the control resource set the transmission configuration indication is associated with.

9. The apparatus according to claim 4, wherein the apparatus is further caused to:

receive, from a network node, a second dynamic indication to change the linking of the first and the second search space sets; and update the reference control resource set based on the changed linking.

10. The apparatus according to claim 3, wherein the apparatus is further caused to, if the configuration for the presence information is not the same in the first and the second control resource sets, determine the field size of the transmission configuration indication in the downlink control information for the multiple transmission reception points physical downlink control channel repetition based on a pre-determined rule regarding a configuration regarding a transmission configuration indication comprised in the first or in the second control resources set.

11. The apparatus according to claim 10, wherein the pre-determined rule comprises one of the following:

the presence information of the transmission configuration indication is enabled if the first search space set or the second search space set comprises the configuration for the presence information as enabled, otherwise the presence information of the transmission configuration is disabled; or the presence information of the transmission configuration indication is enabled if the first search space set and the second search space set comprise the configuration for the presence information as enabled, otherwise the presence information of the transmission configuration is disabled.

12. The apparatus according to claim 1 wherein the indication indicating a validity of the linkage is received via the medium access control control element.

13. The apparatus according to claim 1, wherein the apparatus is further caused to obtain, from a network node, and via a medium access control control element, an indication that the linkage is to be updated such that it is switched from the second search space set to a third search space set associated with a third control resource set.

14. A method comprising:

obtaining information regarding a linkage of a first search space set and a second search space set, wherein the first search space set and the second search space set are different search spaces and are associated with a multi transmission reception point physical downlink control channel repetition, and the first search space is associated with a first transmission reception point and the second search space is associated with a second transmission reception point;

determining, based on the obtained information, that the first search space set and the second search space set are linked search space sets, and the linking is based on radio resource control configuration or a medium access control control element;

determining, for the linked search space sets, a presence information of a transmission configuration indication, wherein the presence information indicates if the transmission configuration indication is enabled or disabled; and based on the presence information, determining a field size of the transmission configuration indication in a downlink control information for the multiple transmission reception point physical downlink control channel repetition, wherein the method further comprises, receiving, from a network node, an indication indicating a validity of the linkage.

15. The method according to claim 14, wherein the presence information is determined based on a pre-determined rule or a pre-determined default value.

16. The method according to claim 14, wherein the first search space set is associated with a first control resource set and the second search space set is associated with a second control resource set and wherein the method further comprises:

determining if a configuration for the presence information is the same in the first and the second control resource sets; and, determining, for the linked search space sets, and based on the determination, the presence information of the transmission configuration indication.

17. The method according to claim 16, wherein the method further comprises:

determining a reference control resource set based on determining that the configuration for the presence information is not the same in the first and the second control resource sets; and determining, for the linked search space sets, and based on the reference control set, the presence information of the transmission configuration indication.

18. The method according to claim 17, wherein the reference control resource set is defined based on radio resource control parameters or based on medium access control element parameters.

19. A non-transitory computer readable medium comprising instructions, when executed by an apparatus, cause the apparatus to perform at least the following:

obtaining information regarding a linkage of a first search space set and a second search space set, wherein the first search space set and the second search space set are different search spaces and are associated with a multi transmission reception point physical downlink control channel repetition, and the first search space is associated with a first transmission reception point and the second search space is associated with a second transmission reception point;

determining, based on the obtained information, that the first search space set and the second search space set are linked search space sets, and the linking is based on radio resource control configuration or a medium access control control element;

determining, for the linked search space sets, a presence information of a transmission configuration indication, wherein the presence information indicates if the transmission configuration indication is enabled or disabled; and based on the presence information, determining a field size of the transmission configuration indication in a downlink control information for the multiple transmission reception point physical downlink control channel repetition, wherein the apparatus is further caused to perform receiving, from a network node, an indication indicating a validity of the linkage.

* * * * *